United States Patent
Fujimoto

[15] 3,641,897
[45] Feb. 15, 1972

[54] SELF-COCKING DEVICE FOR A CAMERA NORMALLY LOADED NONPERFORATED FILM

[72] Inventor: Sakae Fujimoto, Tokyo, Japan
[73] Assignee: Kabushiki Kaisha Ricoh, Tokyo, Japan
[22] Filed: July 5, 1968
[21] Appl. No.: 742,720

[30] Foreign Application Priority Data

| July 10, 1967 | Japan | 42/59586 |
| July 10, 1967 | Japan | 42/59585 |
| July 10, 1967 | Japan | 42/59587 |
| July 21, 1967 | Japan | 42/63169 |

[52] U.S. Cl. ............................................. 95/31 AC, 95/31 FL
[51] Int. Cl. ........................................................... G03b 19/04
[58] Field of Search .................. 95/31, 31 AC; 242/71, 71.4, 242/71.5; 192/55, 56

[56] References Cited

UNITED STATES PATENTS

| 2,319,341 | 5/1943 | Nerwin | 95/31 FSL |
| 3,009,406 | 11/1961 | Takahama | 95/31 |
| 3,157,100 | 11/1964 | Maitani | 95/31 |
| 3,253,526 | 5/1966 | Steisslinger | 95/31 |
| 3,447,440 | 6/1969 | Ettischer | 95/31 X |
| 3,448,670 | 6/1969 | Suzuki | 95/31 |

*Primary Examiner*—Samuel S. Matthews
*Assistant Examiner*—Russell E. Adams, Jr.
*Attorney*—Burgess, Ryan & Hicks

[57] ABSTRACT

A manually operable drive shaft is connected to a winding spool through a clutch mechanism. When a measured amount of film has been advanced as measured by friction roller rotated by the advancing film, the clutch is disengaged and winding stops. The drive shaft continues to be rotated until a shutter is cocked. Disengagement of the clutch is effected by engaging a pawl with a ratchet wheel. Immobilization of the ratchet wheel renders inactive mechanism within the clutch which ordinarily connects the clutch halves.

4 Claims, 10 Drawing Figures

PATENTED FEB 15 1972

INVENTOR
SAKAE FUJIMOTO

BY Burgess Ryan and Wayne
ATTORNEY

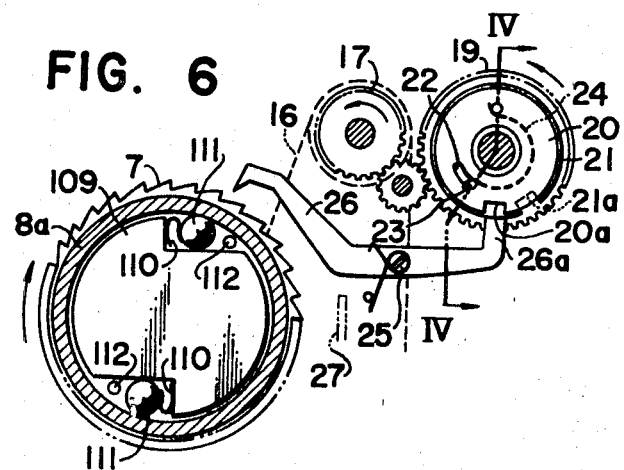
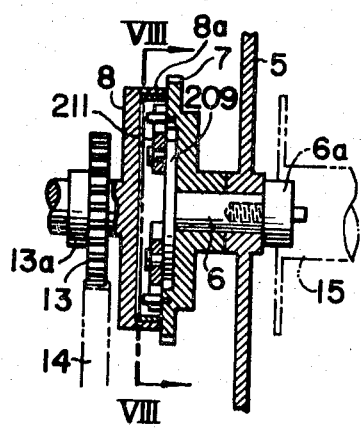
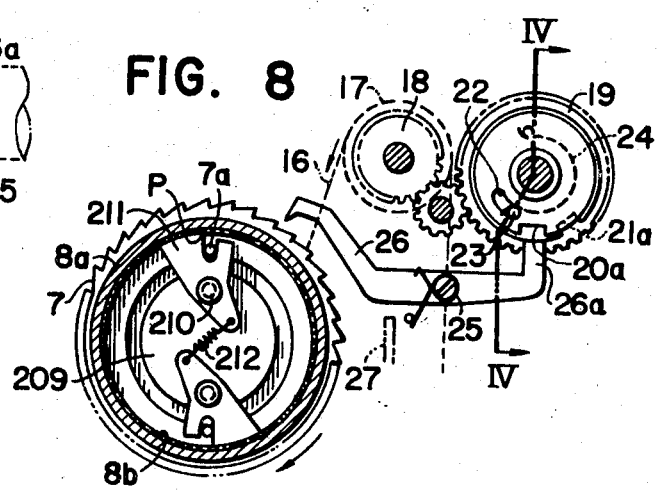
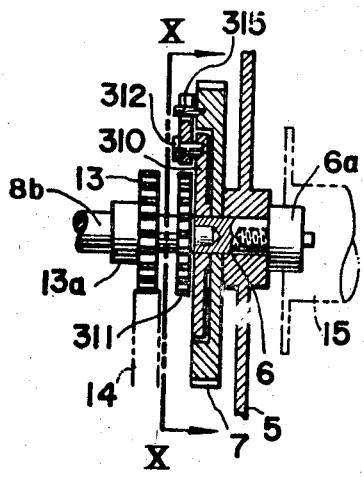
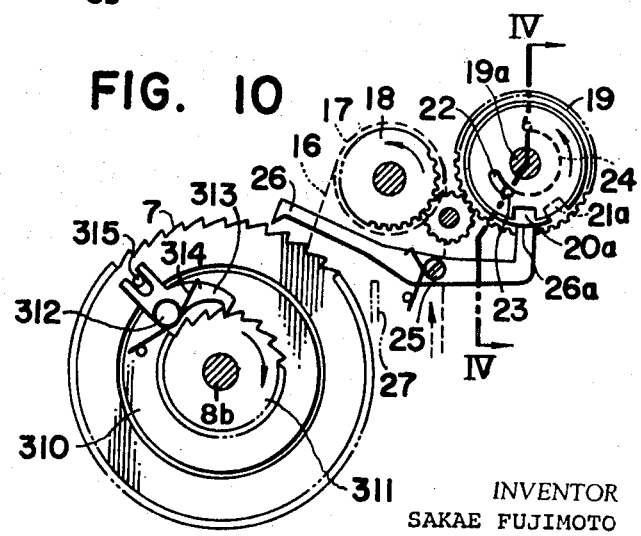

SELF-COCKING DEVICE FOR A CAMERA NORMALLY LOADED NONPERFORATED FILM

BACKGROUND OF THE INVENTION

In a so-called self-cocking camera in which the shutter is cocked by the film winding operation whenever a length of film corresponding to a frame of a picture is advanced, self-cocking can be easily accomplished if a perforated film is used since a sprocket wheel for transporting the perforated film can be interconnected to a shutter cocking mechanism. In a camera designed to use nonperforated film (for example, a roll film having backing paper) a friction wheel is pressed against the back surface of the backing paper and is rotated through a predetermined angle by the resulting frictional force whenever the nonperforated film is wound. In such cameras means are provided for stopping the transportation of the film after the predetermined rotation has been accomplished. In the construction just described, however, the friction wheel is caused to rotate by frictional contact with the film so that it is impossible to obtain thereby sufficient force to drive the shutter-cocking means. Furthermore, because of the increase of the diameter of the cylindrical mass of film wound around the spool as film is wound up the angle of rotation of the knob or manually operated film-advancing lever require for film advance is gradually reduced. However, in order to energize or charge the shutter, rotation of a shutter-cocking charging through a predetermined angle is normally required. Therefore, if it is desired to utilize the rotation of the film-advancing knob as a means of energizing the shutter means, some suitable means adapted to cocking allow rotation of the knob through a constant angle must be provided.

SUMMARY OF THE INVENTION

According to the present invention, shutter-cocking means and film takeup spool driving members are independently carried by a shaft which is rotated by the manual rotation of a film-winding knob. As a shutter-cocking means, for example, a gear carried by the shaft may be employed. As spool-driving members, a ratchet wheel loosely fitted over the shaft and means for engaging said ratchet wheel with said shaft by a friction or ratchet wheel mechanism may be employed. When the film winding knob is rotated and the rotation of the ratchet wheel is not prevented, said spool-driving members are rotated in unison with said shaft by the frictional force developed by the tension of a coil spring so that the spool is driven. But when the rotation of the ratchet wheel is retarded by any suitable means and after a predetermined length of film has been taken up, said spool-driving members are stopped and slide over said shaft. Even after the spool-driving members have been stopped, the said shaft may be rotated to cock the shutter charging means by the means securely fixed to the shaft. When the shutter has been cocked, the rotation of said shaft is stopped.

According to the present invention, the energization of the shutter mechanism can be effected by the strong manual operation so that the shutter can be cocked very positively.

One of the objects of the present invention is to provide a device whose mechanism is simple and which can effect the positive self-cocking for a camera.

In order that the invention may be more readily understood, some embodiments thereof will be described by way of example with reference to the accompanying drawings.

BRIEF DESCRIPTION OF DRAWING

FIG. 6 is a sectional view taken along III—III of FIG. 5;

FIG. 7 is a sectional view of a film winding or transporting spool shaft portion of a third embodiment of the present invention;

FIG. 8 is a sectional view taken along the line III—III of FIG. 7;

FIG. 9 is a sectional view of a film winding or transporting spool shaft portion of fourth embodiment of the present invention; and FIG. 10 is a sectional view taken along the line III—III of FIG. 9.

DESCRIPTION OF THE PREFERRED EMBODIMENTS

Figure 1:
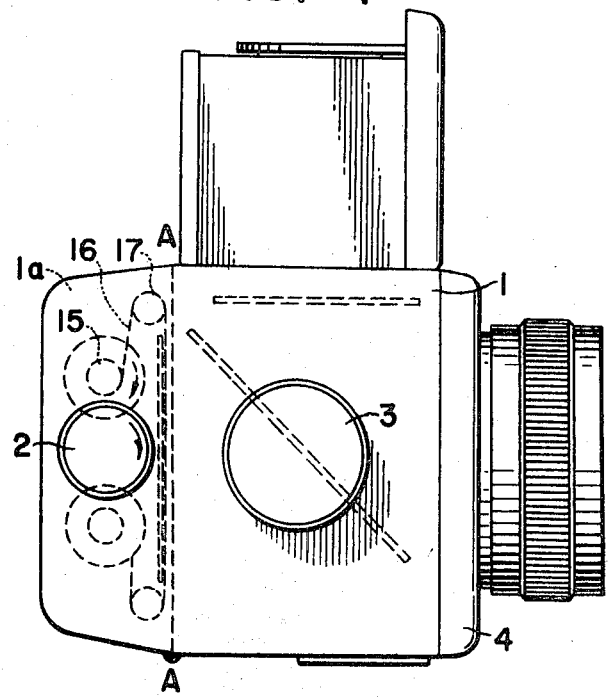
FIG. 1 is a side view of a single reflex camera provided with a self-cocking device of the present invention.

FIG. 1 is a side view of a single lens reflex camera adapted to accept a roll of nonperforated film and provided with a self-cocking device according to the present invention. Reference numeral 1 generally designates a main body casing; 1a, a film-loading chamber which is adapted to be removed from the main body casing 1 along the line A—A if needs arise; 2, a knob for winding the film; and 3 is a knob for advancing or retracting the frame 4 carrying the objective lens barrel.

Figure 2:
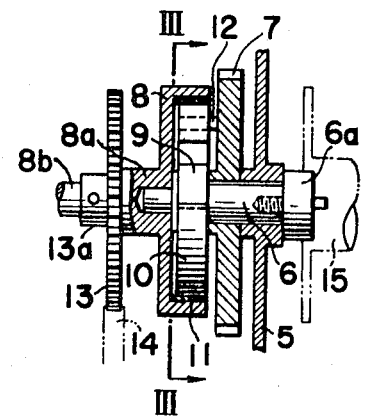
FIG. 2 is a sectional view of a film-winding spool shaft portion of a first embodiment of the present invention.

A sidewall designated by 5 in FIG. 2 is a wall of a main body of a camera disposed in parallel with and spaced apart by a little distance inwardly of a decorative outer wall of the camera. A shaft 6 which is loosely fitted through the wall 5 is so arranged and disposed that the shaft 6 is prevented from moving outwardly of the wall 5 by an enlarged diameter portion 6a. The center hole of a ratchet wheel 7 is fitted over the shaft 6, adjacent to the outer surface of the wall 5. A flanged disk 8 having a bottom portion is loosely fitted over the shaft 6 by means of a boss 8a, the flange of the disk 8 being formed by bending the peripheral edge of the disk 8 so as to extend toward the ratchet wheel 7. A segment 9 carried by the shaft is located within the recess formed by the flange and bottom of disk 8. A steel brake band 10 whose one end is secured to the segment 9 and which has a tendency to expand rapidly extends around the inner surface of a friction lining 11 secured to the inner surface of the annular flange of the disk 8, and the other end of the brake band 10 which is bent inwardly is securely held between a pair of pins 12. A center hole of a gear 13 is fitted over reduced diameter shaft portion 8b extending integrally from the outer end of the boss 8a of the disk 8, and the boss 13a of the gear 13 is securely fixed to the reduced diameter shaft 8a by means of a setscrew or the like. The gear 13 is connected to a shutter-charging device (not shown) through a transmission gear 14 in mesh with the gear 13. The reduced diameter shaft 8a is coupled to the knob 2 shown in FIG. 1 directly or through a suitable gear train. The enlarged diameter portion 6a of the shaft 6 is detachably engages a hub 15 of the film-winding spool.

When the knob 2 shown in FIG. 1 is rotated in the direction shown by the arrow, the winding spool hub 15 is rotated in the direction shown by the arrow in FIG. 1 through the shaft 8b (which is operatively coupled to the knob 2), the peripheral flange of the disk 8, the brake band 10 in contact with the inner surface of the peripheral flange, the segment 9 operatively coupled to the brake band 10, and the shaft 6. Therefore, the film 16 loaded within the camera is advanced and wound around the spool. When the film is being wound or transported, it passes over a roller 17 having a large coefficient of friction so that the roller 17 is also rotated. In this case, the ratchet wheel 7 having no load is also rotated in the direction shown by the arrow in FIG. 3 through the brake band 10 and the pins 12. Furthermore, the gear 18 concentrically integral with the roller 17 causes a gear 19 to rotate in the direction shown by the arrow in FIG. 3 through a suitable intermediate gear train.

Figure 4:
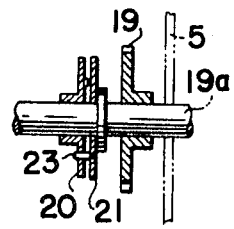
FIG. 4 is a sectional view taken along IV—IV of FIG. 3.

A shaft 19a carrying the gear 19 is fitted with two disks 20 and 21 as shown in FIG. 4. In this case, the disk 20 is securely fixed to the shaft 19a and has a diameter which is slightly smaller than that of the other disk 21 which in turn is loosely fitted over the shaft 19a. An arcuate and short slot 22 is provided eccentrically in the disk 2, and a pin 23 securely fixed to the disk 21 is loosely fitted in the slot 22. One end of a spring 24 in the form of a loop having a tendency to expand outwardly is securely fixed to an eccentric portion of the disk 20 while the other end, that is free end thereof is made in engagement with the pin 23. Therefore, by the outwardly biasing spring force of the spring 24, the disk 21 integral with the pin 23 is urged to rotate in the counterclockwise direction ahead of the disk 20 within the permissible range determined by the slot 22. Notches 20a and 21b are provided respectively at the outer peripheries of the disks 20 and 21. When the pin 23 is located at a position within the slot 22 as shown in FIG. 3, the notch 21a is positioned ahead of the notch 20a in a position corresponding to the permissible angle of the displacement of the pin 23 within the slot 22.

Figure 3:
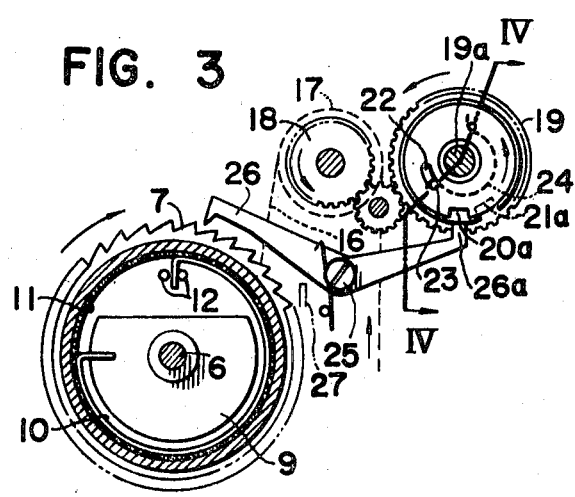
FIG. 3 is a sectional view taken along the line III—III of FIG. 2.

Furthermore, a lever 26 which is pivoted on a pivot 25 intermediate the disk 21 and the ratchet wheel 7 shown in FIG. 3 has a tendency to rock in the counterclockwise direction in FIG. 3. Therefore, when both of the notches 20a and 21a are made coincident with each other and are brought to the position in opposite to a projection 26a at one end of the lever 26, the projection 26a engages with the notches and at the same time the pawl at the other end of the lever 26 engages with the teeth of the ratchet wheel 7. When the shutter mechanism has been cocked the projection 26a is engaged with both of the notches of the disks. Upon release of the cocked shutter one of the arms of the lever 26 is pushed upwardly by means of a shutter-actuating element disposed outside of the camera, for example, a suitable element 27 operatively coupled to the shutter release button. Whereupon the lever 26 is caused to rock in the clockwise direction, so that the projection 26a is disengaged from the notches. Upon such disengagement the disk 21 rotates under the influence of spring 24 and the notches are displaced with respect to each other, whereby the projection 26a cannot engage with the notches even when the shutter button is returned to its normal position, that is when the button is no longer depressed. The mechanical assembly as shown in FIG. 3 is housed in the camera at its back portion (to the left in FIG. 1), and the chamber of the camera in which said assembly is housed extends rearwardly from the lighttight box or chamber of the main body of the camera. This chamber also serves as a film-loading chamber which can be detachably coupled to or hinged to the lighttight box or chamber of the main body of the camera so as to be freely opened or closed.

Next the mode of operation of the device of the present invention will be described. As shown in FIG. 1, the film 16 is loaded in the camera. When the knob 2 is rotated in the direction shown by the arrow in FIG. 1 the spool 15 is also rotated through the shaft 8b, the brake band 10, the segment 9 and the shaft 6 shown in FIG. 2, so that the film is wound around the spool and at the same time the guide roller 17 (See FIG. 3) is rotated. Therefore, the gear 18 integrally formed with the roller 17 is rotated so that the shaft 19a (see FIG. 4) and the disks 20 and 21 carried by the shaft 19a are also rotated in the direction indicated by the arrow shown in FIG. 3 through a suitable gear train. The projection 26a of the lever 26 is pressed against the peripheral surface of the disk 21 which is loosely fitted over the shaft 19a so as to exert to the disk 21 some retarding force so that the disk 20 rotates through an angle determined by the length of the slot 22 before disk 21 begins to rotate, whereby the spring 24 in the form of a loop having a tendency to expand outwardly is compressed. When the pin 23 of the disk 21 reaches the end of the slot 22, the notches 20a and 21b of both of the disks 20 and 21 are aligned. Thereafter, since the pin 23 is pushed by the rear end (the upper end in FIG. 3) of the slot 22, both of the disks 20 and 21 are rotated in unison in the direction indicated by the arrow in FIG. 3. The diameter of the roller 17 is selected in such a manner that when the shaft 19a makes substantially one rotation a length of the film 16 corresponding to one frame of the picture is advanced. Therefore, when the projection 26a of the lever 26 engages with both of the notches 20a and 21a rotated in aligned relation as described above, the pawl at the other end of the lever 26 engages with the teeth of the ratchet wheel 7, thereby preventing the rotation of the ratchet wheel 7. Thereafter, even when the knob 2 shown in FIG. 1 is further rotated, the rotation of the ratchet wheel 7 is not permitted, but the inner surface of the peripheral flange of the disk 8 makes a relative motion with respect to the brake band 10 so as to reduce the curvature of the brake band and no rotation is transmitted to neither of the segment 9 and the shaft 6. Therefore, the spool shaft 15 remains stationary, so that no film is taken up by the spool. Thus, it will be apparent that when the knob 2 is rotated further in the direction shown by the arrow in FIG. 1, the power is transmitted to the shutter-cocking mechanism through the gear 13 carried by the shaft 8b and the gear 14 in mesh with the gear 13. When the shutter-cocking mechanism is energized to the full extent, the mechanism is stopped so that the rotation of the knob 2 and the shaft 8b is also prevented. It will be seen that when the gear 13 is interconnected with a film counter, the film counter mechanism can be driven with a sufficiently strong force as compared with the case in which the film counter mechanism is interconnected with the guide roller 17. When the shutter button or the like is depressed, the element 27 shown in FIG. 3 causes the lever 26 to rock in the clockwise direction so that the projection 26a disengages from the slots 20a and 21a which are held in alignment relation. Then, by means of the biasing force of the spring 24, the disk 21 is made to rotate relative to the disk 20 so that the positions of the notches 20a and 21a are displaced from alignment. Therefore, even when the shutter button is returned to its normal position, that is even when the shutter button is not kept depressed, the projection 26a only presses against the periphery of the large diameter disk 21, so that the pawl at the other end of the lever 26 is disengaged from the ratchet wheel 7, whereby the next film winding or advancing operation is ready to be started. The self-cocking device according to the present invention is particularly suited for use in a miniature camera because of its simple construction in which an ingenious mechanism utilizing the tension and release of the above-described brake band is employed so that even after the film has been transported or wound up, the rotation of the shaft for driving the spool of the film from the outside of the camera can be further utilized in cocking the shutter mechanism after the film winding or takeup operation has been completed.

The relative rotation of the segment 9 with respect to the disk 8 in the first embodiment described above requires only a small angle of rotation, so that the segment 9 is prevented from abutting against the pin 12. But instead of the shape of the segment shown in FIG. 9, a lever extending from the shaft 6 may be used. In this case one end of the brake band 10 is secured to the free end of this lever.

Figure 5:
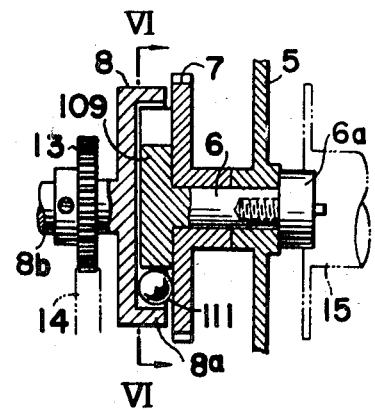
FIG. 5 is a sectional view of a film winding spool shaft portion of a second embodiment of the present invention.

The second embodiment of the present invention shown in FIGS. 5 and 6 is similar to the first embodiment except a frictional sliding mechanism or element different from that shown in FIGS. 2 and 3 is disposed within the peripheral flange 8a of the disk 8.

In FIGS. 5 and 6, a disk 109 carried by the shaft 6 is disposed concentrically within the peripheral flange 8a of the disk 8. At suitable portions of the periphery of the disk 109 are provided notches each having two sides substantially at a right angle with respect to each other. A ball 111 is disposed within a wedge-shaped space defined by the peripheral flange 8a and the notch, the ball 111 being biased toward the narrower portion of the space by means of a spring 110 whose strength is sufficient so that the ball 111 is urged to move toward the narrower portion of the space. A pin 112 extending from the bottom of the disk 8 on the side of the disk 109 is so arranged and disposed as to extend into the narrower portion of the wedge-shaped space relative to the ball 111, that is the portion on the opposite side of the ball 111 from the spring 110.

With the construction as described above, when the film 16 is taken up and the rotation of the ratchet wheel is stopped, by the lever 26 as described hereinbefore, the ratchet wheel 7 is not permitted to rotate further even if the knob 2 is further rotated in the direction shown by the arrow. Therefore, the ball 111 is moved away from the narrower portion by the pin 112 so that no rotation is transmitted to the shaft 6 any longer. Therefore, the spool shaft 15 remains stationary so that no film is taken up by the spool. When the knob 2 shown in FIG. 1 is further rotated in the direction shown by the arrow, the shutter-cocking mechanism is energized or cocked through the gear 13 carried by the shaft 8b and the gear 14 in mesh with the gear 13.

Now referring to FIGS. 7 and 8, the third embodiment of the present invention will be described. A disk 209 carried by the outer end of the shaft 6 is disposed concentrically with the disk 8 within the space defined by the peripheral flange 8a thereof. Pivots 210 are disposed at the points diametrically symmetrical with the respect to the center of the disk 209, and rocking lever members 211 each adapted to serve as a brake shoe are pivotably fixed to the pivots 210 respectively. One arm of the rocking member 211 is bifurcated and one of the bifurcated branches has an arcuate edge so as to contact with the lining member 8b disposed along the peripheral flange 8a of the disk 8.

Between the bifurcated branches is disposed a pin 7a extending from the ratchet wheel 7. The other arms of the rocking lever members are extended in substantially parallel with each other and are interconnected by means of a tension spring 212. Therefore, said arcuate edge of one bifurcated branch tends to press against the lining member disposed along the peripheral flange of the disk 8 by the compression of the spring 212. Furthermore, since one end P of said arcuate edge portion, the pivot 210 of the rocking lever member 211, and the center of the disk 209 are aligned, the above-mentioned arcuate edge of the bifurcated branch is forcibly pressed against the lining member 8b when the member 211 is rotated about its pivot in the clockwise direction in FIG. 8. On the other hand, when the member 211 is rotated about the pivot in the counterclockwise direction, the arcuate edge of the bifurcated branch is disengaged from the lining member 8b so that the retarding force is removed or released. Therefore, when the knob 2 shown in FIG. 1 is rotated in the direction shown by the arrow, the disk 8 which is integral with the shaft 8b which in turn is coupled operatively with the knob 2 is rotated in the direction shown by the arrow so that the disk 209 is caused to rotate in the same direction through the members 211 which are pressed against the lining member 8b as shown by the arrow in FIG. 8. Therefore, the shaft 8b carrying the disk 209 rotates the spool shaft 15 which is adapted to be rotated in unison with the enlarged diameter portion 6a in the direction shown by the arrow, thereby taking up the film 16 around the spool.

Once the ratchet wheel is engaged with the pawl of the lever, the rotation of the ratchet wheel 7 is retarded even when the knob 2 is further rotated in the direction shown by the arrow, so that the brake members 211 are prevented from being pressed against the peripheral flange of the disk 8 by means of the pins 7a extending from the ratchet wheel 7, whereby no rotation is now transmitted to the shaft 6. Therefore, the spool shaft 15 remains stationary so that no film is taken up by the spool.

Next referring FIGS. 9 and 10, the fourth embodiment of the present invention will be described hereinafter. The gear 13 and a ratchet wheel 311 are carried by the shaft 6 in juxtaposed relation with each other. A rocking pawl 313 is pivoted to a pivot 312 securely fixed at a suitable peripheral portion of a disk 310 disposed within the recess of the ratchet wheel 7 and loosely mounted on shaft 6. This pawl 313 tends to engage with the ratchet wheel 311 by means of the biasing force of a suitable spring 314. The other end of the pawl 313 remote from the ratchet wheel 311 is bifurcated, and between the bifurcated branches is loosely held a pin 315 extending from one side of the ratchet wheel 7. Ratchet wheel 7 is rigidly affixed to shaft 6. In this embodiment, the gear 13 carried by the shaft 6 is adapted to energize the shutter-cocking mechanism and also to drive a film counter mechanism through the gear 14 in mesh with the toothed wheel 13.

With the construction described above, when the knob 2 in FIG. 1 is rotated in the direction shown by the arrow, the disk 310 and the ratchet wheel 7 are rotated in unison in the direction shown by the arrow in FIG. 10 through the shaft 8b operatively coupling to the knob 2, the ratchet wheel 311 and the pawl 313, and at the same time the film is taken up by the spool in the direction indicated by the arrow in FIG. 1 because the shaft 6a carried by shaft 6 rotates the spool shaft 15. When the film is being taken up, the film passes over the roller 17 (which has a large coefficient of friction) so as to rotate the roller 17. In this case, the gear carried by the same shaft of the guide roller 17 rotates the gear 19 through a suitable intermediate gear train in the direction shown by the arrow in FIG. 10.

As in the case of the foregoing embodiments, once the ratchet wheel 7 is engaged with the pawl 26 of the lever, the rotation of the ratchet wheel 7 is stopped so that the rotation of the knob 2 and ratchet wheel 311 causes the pawl 313 to rotate about the pin 315 as an instantaneous center in the counterclockwise direction, whereby the pawl 313 is disengaged from the ratchet wheel 311, rides over one tooth of the ratchet wheel 311 and falls into the engagement with the next space between the teeth. Such motion is repeated when the shaft 6, that is the ratchet wheel 311 is rotated in the same direction. During the above-described motion, the disk 310 is permitted only to make reciprocal motions about the axis thereof within a very small angular range and is never permitted to rotate. Furthermore, once the rotation of the ratchet wheel 7 is stopped, the ratchet wheel 311 only permits the pawl 313 to reciprocate within a very small angular range by clicking the pawl 313, but the continuous rotation of the ratchet wheel 311 is freely permitted.

The foregoing description is merely an illustration of four embodiments of the present invention to illustrative embodiments.

I claim:

1. A shutter-cocking and film-winding device for a camera comprising
   a drive shaft adapted to be rotated in a first direction during a film-winding and shutter-cocking operation;
   a first ratchet wheel mounted concentrically with the drive shaft;
   measuring means for preventing the rotation of the first ratchet wheel following the advance of a film through a preselected distance during a film-winding operation;
   a film-winding shaft mounted concentrically with the drive shaft and adapted for connection in driving relation with a film takeup spool;
   connecting means normally connecting the drive shaft to the film-winding shaft in driving relation thereto;
   inactivating means for inactivating the connecting means when the first ratchet wheel is prevented from rotating, whereby the drive shaft is no longer connected in driving relation to the film-winding shaft;
   means for transmitting the rotation of the drive shaft to a shutter-cocking device;
   the connecting means comprising
      a drum mounted upon and rotatable with one of the shafts, said drum having a cylindrical inner surface defining a recess,
      a holding member mounted upon and rotatable with the other shaft,
      a brake band within the recess normally biased radially outward against the inner surface of the drum in frictional contact therewith, whereby driving force can be transmitted through the brake band between the shafts, said brake band having a leading and a trailing end as it rotates with the shafts, the leading end being fastened to the holding member for rotation therewith;
   the inactivating means comprising
      means for connecting the first ratchet wheel to the trailing end of the brake band, whereby immobilization of the first ratchet wheel immobilizes the trailing end of the brake band;

the measuring means comprising a blocking pawl engageable with the first ratchet wheel, a film-contacting roller contacting the film for rotation thereby as the film is wound on the takeup spool, and control means for holding said blocking pawl out of engagement with the first ratchet wheel until the roller has been rotated through a desired rotation angle and then moving said blocking pawl into locking engagement with the first ratchet wheel;

the control means comprising pivot means for supporting the blocking pawl for rotation between a disengaged position in which the blocking pawl does not engage the first ratchet wheel and an engaged position in which the blocking pawl does engage the first ratchet wheel;

resilient pawl-moving means for urging the blocking pawl into the engaged position;

a control shaft rotatable in response to rotation of the film-contacting roller;

a circular first disk fixed to the control shaft;

a circular second disk mounted coaxially of the control shaft and rotatable relative thereto;

means for limiting the rotation of the first disk relative to the second disk to rotation between a normal and a driving position;

means for resiliently biasing the first disk into the normal position;

a first notch extending inward from the periphery of the first disk;

a second notch extending inward from the periphery of the second disk, said second notch being aligned with the first notch when the first disk is in the driving position and out of alignment with the first notch when the first disk is in the normal position;

an arm connected to the blocking pawl for rotation therewith, said arm having a contact member normally resiliently urged into contact with the periphery of the second disk by the pawl-moving means when the blocking pawl is in the disengaged position, said contact member being movable into an engaged position within the notches of the first and second disks when said notches are aligned, said movement advancing the blocking pawl into the engaged position; and means operable following an exposure of the film for moving the blocking pawl out of engagement with the ratchet wheel into the disengaged position.

2. A shutter-cocking and film-winding device for a camera comprising a drive shaft adapted to be rotated in a first direction during a film-winding and shutter-cocking operation;

a first ratchet wheel mounted concentrically with the drive shaft;

measuring means for preventing the rotation of the first ratchet wheel following the advance of a film through a preselected distance during a film-winding operation;

a film-winding shaft mounted concentrically with the drive shaft and adapted for connection in driving relation with a film takeup spool;

connecting means normally connecting the drive shaft to the film-winding shaft in driving relation thereto;

inactivating means for inactivating the connecting means when the first ratchet wheel is prevented from rotating, whereby the drive shaft is no longer connected in driving relation to the film-winding shaft;

means for transmitting the rotation of the drive shaft to a shutter-cocking device;

the connecting means comprising a drum mounted upon and rotatable with one of the shafts, said drum having a cylindrical inner surface defining a recess, a disk mounted upon and rotatable with the other shaft and disposed within the recess, said disk having in its periphery a notch defined in part by a notch surface extending at an acute angle to the cylindrical inner surface, rotation of the drum relative to the disk-moving portions of the inner surface toward the apex of said acute angle, a rolling member of circular cross section in the notch, and means for biasing said rolling member jams between the disk and the drum and prevents rotation of the drum relative to the disk in the first direction;

the inactivating means comprising means extending from the ratchet wheel into the space between the rolling member and the apex of the acute angle for preventing motion of the rolling member in the first direction when rotation of the ratchet wheel is prevented;

the measuring means comprising a blocking pawl engageable with the first ratchet wheel, a film-contacting roller contacting the film for rotation thereby as the film is wound on the takeup spool, and control means for holding said blocking pawl out of engagement with the first ratchet wheel until the roller has been rotated through a desired rotation angle and then moving said blocking pawl into locking engagement with the first ratchet wheel;

the control means comprising pivot means for supporting the blocking pawl for rotation between a disengaged position in which the blocking pawl does not engage the first ratchet wheel and an engaged position in which the blocking pawl does engage the first ratchet wheel;

resilient pawl-moving means for urging the blocking pawl into the engaged position;

a control shaft rotatable in response to rotation of the film-contacting roller;

a circular first disk fixed to the control shaft;

a circular second disk mounted coaxially of the control shaft and rotatable relative thereto;

means for limiting the rotation of the first disk relative to the second disk to rotation between a normal and a driving position;

means for resiliently biasing the first disk into the normal position;

a first notch extending inward from the periphery of the first disk;

a second notch extending inward from the periphery of the second disk, said second notch being aligned with the first notch when the first disk is in the driving position and out of alignment with the first notch when the first disk is in the normal position;

an arm connected to the blocking pawl for rotation therewith, said arm having a contact member normally resiliently urged into contact with the periphery of the second disk by the pawl-moving means when the blocking pawl is in the disengaged position, said contact member being movable into an engaged position within the notches of the first and second disks when said notches are aligned, said movement advancing the blocking pawl into the engaged position; and means operable following an exposure of the film for moving the blocking pawl out of engagement with the ratchet wheel into the disengaged position.

3. A shutter-cocking and film-winding device for a camera comprising a drive shaft adapted to be rotated in a first direction during a film-winding and shutter-cocking operation;

a first ratchet wheel mounted concentrically with the drive shaft;

measuring means for preventing the rotation of the first ratchet wheel following the advance of a film through a preselected distance during a film-winding operation;

a film-winding shaft mounted concentrically with the drive shaft and adapted for connection in driving relation with a film takeup spool;

connecting means normally connecting the drive shaft to the film-winding shaft in driving relation thereto;

inactivating means for inactivating the connecting means when the first ratchet wheel is prevented from rotating, whereby the drive shaft is no longer connected in driving relation to the film-winding shaft;

means for transmitting the rotation of the drive shaft to a shutter-cocking device;

the connecting means comprising a drum mounted upon and rotatable with one of the shafts, said drum having a cylindrical inner surface defining a recess, a holding member mounted upon and rotatable with the other shaft, a rocking member pivotally supported by the holding member and located within the recess, said rocking member normally contacting the cylindrical inner surface, spring means for urging the rocking member into contact with the cylindrical inner surface;

the inactivating means comprising means for connecting the ratchet wheel to the rocking member at a position between the cylindrical inner surface and the pivotal mounting whereby immobilization of the ratchet wheel prevents rotation of the rocking member in the first direction;

the measuring means comprises a blocking pawl engageable with the first ratchet wheel, a film-contacting roller contacting the film for rotation thereby as the film is wound on the takeup spool, and control means for holding said blocking pawl out of engagement with the first ratchet wheel until the roller has been rotated through a desired rotation angle and then moving said blocking pawl into locking engagement with the first ratchet wheel;

the control means comprising pivot means for supporting the blocking pawl for rotation between a disengaged position in which the blocking pawl does not engage the first ratchet wheel and an engaged position in which the blocking pawl does engage the first ratchet wheel;

resilient pawl-moving means for urging the blocking pawl into the engaged position;

a control shaft rotatable in response to rotation of the film-contacting roller;

a circular first disk fixed to the control shaft;

a circular second disk mounted coaxially of the control shaft and rotatable relative thereto;

means for limiting the rotation of the first disk relative to the second disk to rotation between a normal and a driving position;

means for resiliently biasing the first disk into the normal position;

a first notch extending inward from the periphery of the first disk;

a second notch extending inward from the periphery of the second disk, said second notch being aligned with the first notch when the first disk is in the driving position and out of alignment with the first notch when the first disk is in the normal position;

an arm connected to the blocking pawl for rotation therewith, said arm having a contact member normally resiliently urged into contact with the periphery of the second disk by the pawl-moving means when the blocking pawl is in the disengaged position, said contact member being movable into an engaged position within the notches of the first and second disks when said notches are aligned, said movement advancing the blocking pawl into the engaged position; and means operable following an exposure of the film for moving the blocking pawl out of engagement with the ratchet wheel into the disengaged position.

4. A shutter-cocking and film-winding device for a camera comprising a drive shaft adapted to be rotated in a first direction during a film-winding and shutter-cocking operation;

a first ratchet wheel mounted concentrically with the drive shaft;

measuring means for preventing the rotation of the first ratchet wheel following the advance of a film through a preselected distance during a film-winding operation;

a film-winding shaft mounted concentrically with the drive shaft and adapted for connection in driving relation with a film takeup spool;

connecting means normally connecting the drive shaft to the film-winding shaft in driving relation thereto;

inactivating means for inactivating the connecting means when the first ratchet wheel is prevented from rotating, whereby the drive shaft is no longer connected in driving relation to the film-winding shaft;

means for transmitting the rotation of the drive shaft to a shutter-cocking device;

the connecting means comprising a second ratchet wheel mounted upon and rotatable with the drive shaft, a ratchet wheel mounted upon and rotatable with the film-winding shaft, a disk loosely mounted coaxially with the drive shaft, a ratchet pawl pivotally supported by the disk movable between an engaged position in which said ratchet pawl engages the second ratchet wheel for rotation therewith in the first direction and a disengaged position in which said ratchet pawl is disengaged from the second ratchet wheel, permitting rotation of the second ratchet wheel in the first direction independently of the ratchet pawl, means for normally biasing the ratchet pawl into the engaged position, the inactivating means comprising disconnecting means connecting the ratchet wheel and the ratchet pawl for moving the ratchet pawl into the disengaged position when the ratchet wheel is prevented from rotating;

the measuring means comprises a blocking pawl engageable with the first ratchet wheel, a film-contacting roller contacting the film for rotation thereby as the film is wound on the takeup spool, and control means for holding said blocking pawl out of engagement with the first ratchet wheel until the roller has been rotated through a desired rotation angle and then moving said blocking pawl into locking engagement with the first ratchet wheel;

the control means comprising pivot means for supporting the blocking pawl for rotation between a disengaged position in which the blocking pawl does not engage the first ratchet wheel and an engaged position in which the blocking pawl does engage the first ratchet wheel;

resilient pawl-moving means for urging the blocking pawl into the engaged position;

a control shaft rotatable in response to rotation of the film-contacting roller;

a circular first disk fixed to the control shaft;

a circular second disk mounted coaxially of the control shaft and rotatable relative thereto;

means for limiting the rotation of the first disk relative to the second disk to rotation between a normal and a driving position;

means for resiliently biasing the first disk into the normal position;

a first notch extending inward from the periphery of the first disk;

a second notch extending inward from the periphery of the second disk, said second notch being aligned with the first notch when the first disk is in the driving position and out of alignment with the first notch when the first disk is in the normal position;

an arm connected to the blocking pawl for rotation therewith, said arm having a contact member normally resiliently urged into contact with the periphery of the second disk by the pawl-moving means when the blocking pawl is in the disengaged position, said contact member being movable into an engaged position within the notches of the first and second disks when said notches are aligned, said movement advancing the blocking pawl into the engaged position; and means operable following an exposure of the film for moving the blocking pawl out of engagement with the ratchet wheel into the disengaged position.

* * * * *